United States Patent

[11] 3,522,776

[72] Inventor: Fausto Celorio Mendoza
Cumbres de Acultzingo No. 185,
Lomas de Chapultepec, Mexico
City, Mexico
[21] Application No.: 761,743
[22] Filed: Sept. 23, 1968
[45] Patented: Aug. 4, 1970

[54] AUTOMATIC DOUGH PROCESSING MACHINES
8 Claims, Drawing Figs.
[52] U.S. Cl. .................................................. 107/8,
107/15
[51] Int. Cl. .................................................. A21c 5/00
[50] Field of Search ...................................... 107/8.35,
8.5, 15.1, 15.5, 15.7, 15.9; 18/2RA, 21; 118/
Doctor & Scraper Dig; 15/261 256.51

[56] References Cited
UNITED STATES PATENTS
2,675,768   4/1954   Helm ...................... 107/8(35)

Primary Examiner— Walter A. Scheel
Assistant Examiner— Robert I. Smith
Attorney—Jeffers and Young ABSTRACT: An automatic dough processing machine having a pair of dough-shaping rolls rotatively mounted on parallel axes. Dough is supplied to the rolls from above and passes downwardly between the rolls while adhering to one thereof. The machine is provided with an endless belt conveyor disposed below the rolls to receive the processed dough therefrom. A pressure regulating device is placed at a point near the bight of the rolls. A wire is positioned at an angle to and flush with the surface of the said one of the rolls following the bight and is connected to a frequency device for imparting longitudinal vibrations to the wire for detaching the dough from the surface of the said one roll without, however, impairing the texture of the surface of the dough.

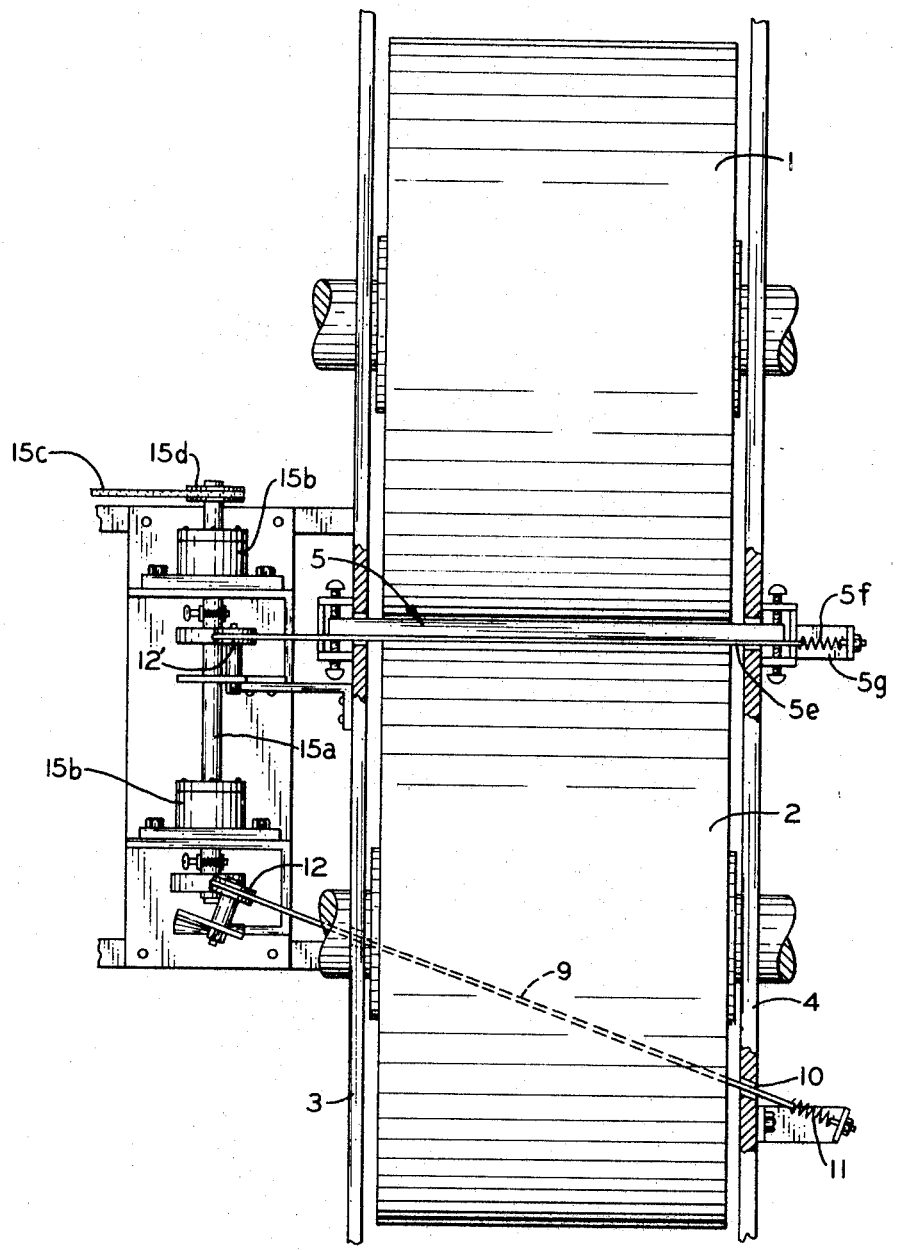

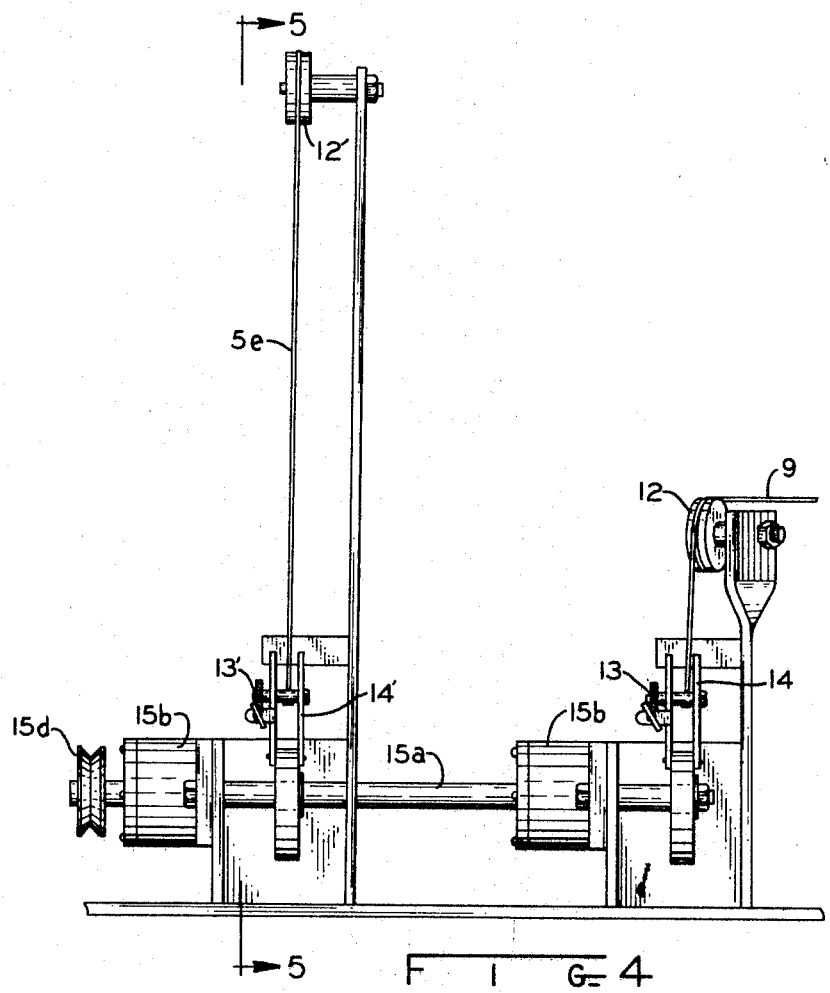
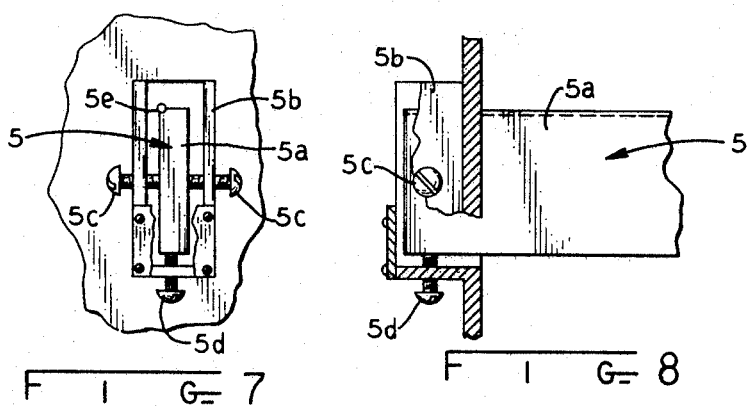

Patented Aug. 4, 1970

INVENTOR
FAUSTO CELORIO

BY *Jeffers and Young*
ATTORNEYS

U.S. PATENT 3,522,776
AUTOMATIC DOUGH PROCESSING MACHINES

The present invention relates to improved automatic dough processing machines. More particularly, it concerns a device for regulating the pressure of the dough fed to the forming station of the dough processing machine and a device detaching the formed raw dough from the surface supporting the dough.

It is a well known fact that a great variety of automatic dough processing machines, of various and different designs, are available on the market. Most of these, however, use a pair of rolls through which the dough is passed in order to impart the necessary shape to the dough. Sometimes the dough, as it passes through the pair of rolls, conforms itself to a metal plate of a certain thickness which is later cut to a circular configuration for a circular shape the purpose of giving the dough a desired shape, for example, a circular shape for tortillas.

At other times, a circular recess is provided in the surface of one roll into which the dough is pressed when it passes between the rolls.

In all such types of automatic dough processing machines referred to above, the dough descends and enters the slot, or bight, between the rolls. The said rolls are driven to rotate in respectively opposite directions with the sides of the rolls facing each other moving downwardly whereby the dough will be drawn downwardly between the rolls. With the dough processing machines of the present invention the dough pressure increases on contacting a pressure regulating device located between the rolls, which presents a certain degree of resistance to the passage of the dough, whereby, due to this greater pressure, a dough cake is formed that is more compact, of better quality and free of pores and voids.

On the other hand, in the automatic manufacture of such dough cakes, a serious problem arises when the raw dough is to be detached from the surface of the roll to which it adheres. A great many devices have heretofore been used for this purpose, which, however, have failed to solve the separation or detachment problem entirely.

Thus, for example, knives or fixed wires have been used, placed adjacent the surface to which the dough adheres. These devices, however, are not fully satisfactory, inasmuch as the knives, for instance, in detaching the dough, effect a considerable deformation of the dough and can make the dough useless for the automatic production purposes sought with this type of processing machines.

On the other hand, the use of fine wires for this purpose does not satisfy the conditions required for efficient operation, because, while such wires succeed in separating the dough from the surface, the surface area contacted by the wire is damaged, thereby seriously affecting the texture of the finished product.

It is an object of the present invention to provide a device operable for regulating the dough pressure in automatic dough processing machines.

Another object of the present invention is the provision of a dough detaching device which is more effective and more convenient than those heretofore known and used.

Another object of the present invention is the provision of a dough detaching device which takes a longitudinal vibratory motion of a conventional frequency.

A further object of the present invention is the location of the pressure regulating device so that ease of operation is secured.

Another object of the present invention is the provision of an automatic dough processing machine having simplicity of design and relatively low cost.

Another object of the present invention is the provision of a dough detaching device which performs in such a manner that the characteristics of the separated dough are in no way impaired.

These and other objects and advantages of the present invention will become more clearly apparent from the following detailed description, taken in connection with the accompanying drawings, in which:

FIGURE 3 is a top view of the processing machine;

FIGURE 4 is a side view of the mechanism for imparting motion both to the wire or knife of the dough removing device and to an element of the pressure controlling device;

FIGURE 7 is a view illustrating the manner in which the ends of a bar forming a part of the pressure controlling device are secured to the machine frame; and FIGURE 8 is a view looking in at the left side of FIGURE 7.

Figure 1:
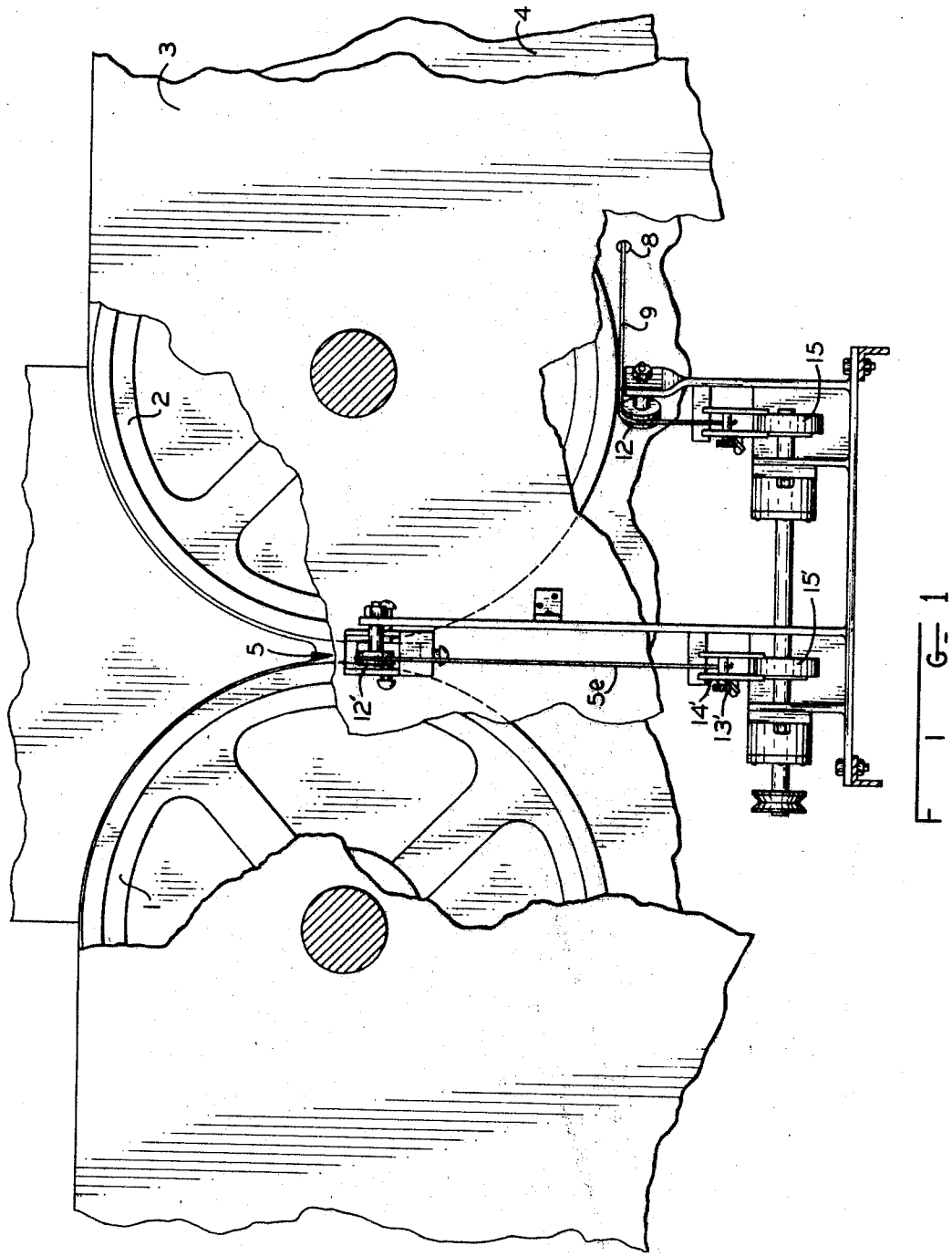
FIGURE 1 is a side view of the upper portion of a dough processing machine according to the present invention showing the rolls and pressure controlling device and a dough removing device.
Figure 2:
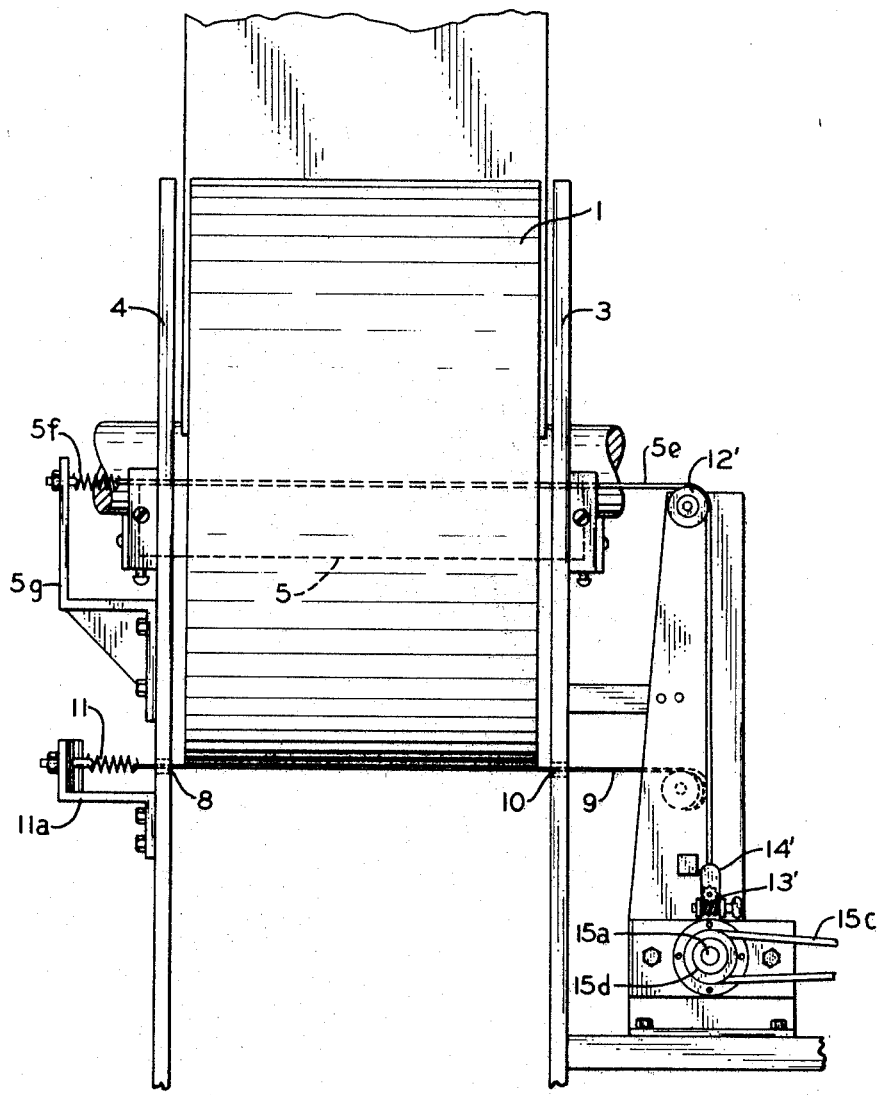
FIGURE 2 is a view of the processing machine looking in from the left side of FIGURE 1.

Referring to the drawings more in detail, and particularly to FIGURE 1, it will be observed that the dough processing machine of the present invention consists of two upper rolls 1, 2, having shafts rotatably supported by bearings in two plates 3, 4, forming a part of the machine frame. In the space between the rolls is fixedly mounted a pressure regulating device 5, to be described hereinafter.

Roll 1 is adapted to be moved in parallelism with itself so as to approach toward or draw away from, roll 2. The mechanism for so moving roll 1 is not shown but is known.

The above described movement of roll 1 is provided for the purpose of regulating the distance between roll 1 and the regulating device 5. Device 5 comprises a bar 5a mounted in holders 5b at the ends of the bar. Holders 5b are carried by the frame of the machine and have opposed lateral screws 5c engaging the sides of the bar and bottom screw 5d engaging the bottom of the bar. The pressure regulating, or controlling, device also has a wire 5e resting in a longitudinal notch in a top corner of bar 5a, preferably, the corner nearest roll 2.

As has been pointed out before, wire 5e may be replaced by a knife to which also a longitudinal vibratory motion is imparted, although in the embodiment herein described reference generally will be made to a wire.

The wire 5e has its one end connected by a spring 5f to a bracket 5g attached to the machine frame.

The other end of wire 5e passes over a stationarily mounted rotatable pulley 12' and is secured to a yoke 14' which includes a mechanism 13' adjustable for adjusting the tension on wire 5e.

Yoke 14' is connected to a ring 14'' which surrounds an eccentric 15'.

Bar 5a engages the surface of roll 1 and may be spaced from the surface of roll 2 so the dough is caused to pass downwardly between roll 2 and bar 5a. Wire 5e assists in this action.

For the purpose of detaching the dough from roll 2, a wire 9 is provided which enters the bore 8 of plate 4 and, traversing the surface of roll 2 in an inclined manner, comes out through bore 10 of plate 3. The end of wire 9 at one end is connected to plate 4 by means of spring 11 and bracket 11a.

Figure 5:
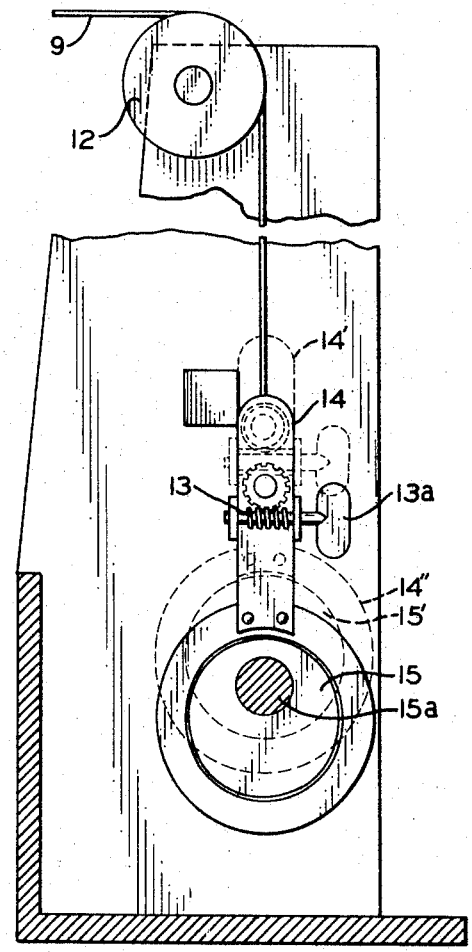
FIGURE 5 is a sectional view indicated by V-V on FIGURE 4 and showing in detail a part of the motion-imparting mechanism of FIGURE 4 and showing how the wire of the separating device is kept taut.

As may be observed in FIGURE 5, wire 9 passes over stationarily mounted pulley 12 and is fixed to a post, or shaft, 9b which is connected by a worm drive 13 to an adjusting knob 13a. Knob 13a can be turned to regulate the tension on wire 9. Post 9b is mounted in a U-shaped part 14 which, in turn, is attached to ring 14a in which runs an eccentric 15 on shaft 15a which is supported by bearing 15b and driven by a motor (not shown) via belt 15c and pulley 15d on shaft 15a.

Figure 6:
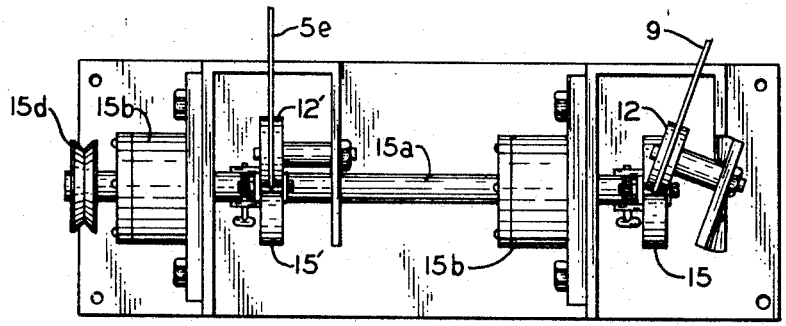
FIGURE 6 is a view looking down on top of FIGURE 5.

In the pressure regulating device, the wire alone may move, or the wire and bar may move as a unit. As it may be seen in FIGURE 1, and more clearly in FIGURE 6, both the wire 9 and the pressure regulating device 5 move, or vibrate, in a longitudinal direction. This motion is provided through the aforementioned eccentric 15 for wire 9 and eccentric 15' for wire 5e, both mounted on shaft 15a so as to be simultaneously driven by the motor referred to.

Although in the illustrated embodiment, wire 9 is placed at the lower portion of roll 2, the position of the wire may, of course, be considerably varied and it may be placed directly beneath the lower edge of the regulating element 5 or at any other position about the periphery of roll 2 which will permit the dough loosened by the wire to drop to the conveyor. It is likewise evident that several wires may be used instead of one.

In the operation of the machine, the dough descends towards the dough forming region between the rolls 1, 2, from a hopper or a similar adequate receptacle. The dough enters the space between the rolls and moves downwardly until it touches the regulating element 5. Here only the dough needed will pass between the regulator 5 and the roll 2. Consequently, there will be caused the passage of a sheet of dough of the thickness required according to the distance at which the regulator 5 is from roll 2.

Now in the case of the roll being of the die-stamped type i.e., in cases where the roll 2 has formed cavities to give the necessary shape to the dough, the regulating element 5 may be in direct contact with the surface of roll 2, so that only the dough contained in the stamped spaces is permitted to pass by the regulating device.

Once the dough, whether shaped like a cake or in a laminar manner, has passed the separating element, it will remain adhered to the surface of roll 2 until it contacts the wire 9.

If the wire 9 should be stationary, the dough would become detached in certain cases, but when this should so happen the dough surface texture could be damaged, as previously explained.

However, in order to avoid this problem, wire 9, according to the present invention, is caused to take a longitudinal, vibratory motion.

As previously stated, a vibratory motion of a suitable frequency is imparted to the wire 9 for the purpose of obtaining a more efficient detachment of the dough adhered to the surface of roll 2.

The dough, once it has become detached from the surface of roll 2, will drop to the surface of an endless belt or any other adequate device located beneath roll 2 and which will convey the detached dough towards a baking region, or towards a cutting region.

A dough detaching device in the shape of a moving wire has specifically shown and described, but a knife may be made use of with identical results, because the effect described is attained through the motion imparted to the dough detaching device.

Likewise, several wires or knives, rather than only one, as might be required, may be used.

It is of course likewise possible to provide the longitudinal vibratory motion by means of devices other than the particular one shown and described.

Although only one embodiment of the invention has been described and illustrated, it is nevertheless evident that those familiar with the art may effect various changes and modifications without departing from the spirit and scope of the invention, and it is therefor understood that the specification and drawings are illustrative, and not limitative, in character and that the scope of the invention is defined in the terms of the following claims.

I claim:

1. In an automatic dough processing machine: a pair of rolls mounted on parallel horizontal axes and rotating in a direction to cause the sides thereof facing each other to move downwardly, means to feed dough into the space between said rolls from above, a pressure regulating device in the space between said rolls and extending parallel to the roll axes, said pressure regulating device causing dough to adhere to one of said rolls and be drawn downwardly past the pressure regulating device thereby, and detaching means for detaching the said adhered dough from said one roll after the dough passes said pressure regulating device, said detaching means comprising an element extending transversely of said one roll adjacent the surface thereof whereby the dough adhered to said one roll comes into engagement with said element as the said one roll turns, and means for vibrating said element in the direction of its length to cause the dough to become detached from said one roll without deforming the said dough.

2. A dough processing machine according to Claim 1 in which said pressure regulating device comprises a bar extending parallel to said roll axes and substantially rectangular in cross section, means supporting said bar for vibrating movement in a direction parallel to said roll axes, and means for vibrating said bar in said direction.

3. A dough processing machine according to Claim 2 in which said means for vibrating said bar comprises a wire connected thereto and extending in said direction out from the space between said rolls at one end of said bar, and a rotatable eccentric operatively connected to said wire.

4. A dough processing machine according to Claim 3 in which said bar has sharp upper corners.

5. A dough processing machine according to Claim 1 in which said pressure regulating device is operable at different levels in the space between said rolls.

6. A dough processing machine according to Claim 1 in which said element is in the form of a wire, a tension spring connected to one end of said wire, and eccentric means connected to the other end of said wire operable for vibrating the wire in the direction of its length.

7. A dough processing machine according to Claim 6 in which said wire extends across said one roll at an angle.

8. A dough processing machine according to Claim 6 in which said wire engages the surface of said one roll so as to be operable to detach dough from said one roll when the roll is provided with cavities into which the dough is pressed as the dough is drawn past said pressure regulating device.